Feb. 25, 1941.  P. A. FRIEDELL  2,233,255
STEP-EXPOSING MACHINE FOR PHOTOSENSITIVE MATERIALS
Filed Sept. 11, 1939  5 Sheets-Sheet 1

Inventor
Philip A. Friedell

Feb. 25, 1941.　　　P. A. FRIEDELL　　　2,233,255
STEP-EXPOSING MACHINE FOR PHOTOSENSITIVE MATERIALS
Filed Sept. 11, 1939　　　5 Sheets-Sheet 2

Inventor
Philip A. Friedell

Feb. 25, 1941. P. A. FRIEDELL 2,233,255

STEP-EXPOSING MACHINE FOR PHOTOSENSITIVE MATERIALS

Filed Sept. 11, 1939 5 Sheets-Sheet 3

Inventor
Philip A. Friedell

Feb. 25, 1941.  P. A. FRIEDELL  2,233,255
STEP-EXPOSING MACHINE FOR PHOTOSENSITIVE MATERIALS
Filed Sept. 11, 1939  5 Sheets-Sheet 4

Inventor
Philip A. Friedell

Patented Feb. 25, 1941

2,233,255

UNITED STATES PATENT OFFICE 2,233,255

STEP-EXPOSING MACHINE FOR PHOTO-SENSITIVE MATERIALS

Philip A. Friedell, Oakland, Calif.

Application September 11, 1939, Serial No. 294,325

13 Claims. (Cl. 95—10)

This invention, a step-exposing machine for photo-sensitive materials and method of measuring is adapted to the production of step wedges and to the determination of the characteristics and effects of photographic materials and photo-sensitive elements including the determination of the photo-actinic power of various sources of illumination as differentiated from the total illuminating power; development of characteristic curve paths; determination of tonal range, exposure factor, speed and sensitivity of photo-sensitive materials such as plates, films and papers; effects of changes in time or temperature of development, concentration of developer, elimination, substitution or addition of chemical constituents; production of photographic wedges and scales; and for carrying out various ones of the steps and procedures disclosed in my co-pending application Serial Number 227,365, filed August 29, 1938, for Photographic scale and system of determination and measurement of characteristics of photographic elements.

In the usual processes, taking for instance the test for sensitivity or speed of a photographic plate, the plate is exposed in a series of steps by a single revolution of a sector wheel. With this type of apparatus, adjustments are limited to the speed of rotation and to the strength of the light. This type of machine is cumbersome, requires a great deal of floor space, and is limited as to the number of steps by the inertia of the sector wheel, the usual sector wheel exposing about thirteen steps with a factor or ratio of about 1.40. The densities of the respective steps are determined usually by means of a densitometer. Thus the successive steps receive exposures equal to about 140% of the immediately preceding steps, and the densities are determined in values of all-light transmitting power instead of in terms of photo-actinic light only. This ratio of 1.40, instead of producing only one step, is capable of producing within its limits at least thirty perceptible steps by my system, for extremely fine measurements, and at least eight steps for normal or ordinarily and very clearly perceptible measurements.

This new machine is practically unlimited as to the number of steps and as to the cumulative exposure, and is adapted equally for exposing and testing films, plates, chloride, chloro-bromide and bromide papers, and other photo-sensitive materials, and is universally adjustable as to the exposures of the various steps, and is therefore peculiarly adapted to the production of photographic wedges and scales.

The objects of the invention are as follows:

First; to provide a machine for exposing photo-sensitive elements in a series of steps with any desired ratios of exposures between the various steps.

Second; to provide a machine as outlined which operates with maximum precision and which is entirely free of cumulative error.

Third; to provide a machine in which the number of steps operating is variable at will for any desired cumulative exposure within the limits of the operating time of the machine.

Fourth; to provide a machine in which the cumulative exposure is variable at will for any desired number of steps within the capacity of the machine.

Fifth; to provide an adjustable source of exposure illumination with precision adjustment without changing the source or character of the illumination.

Sixth; to provide a machine for exposing a medium in two series of steps at right angles to each other to produce a characteristic curve path for development of the characteristic curve of the medium.

Seventh; to provide a machine as outlined with threshold step and speed indicators to indicate directly the limits of perceptible effects of exposures on a medium following development of the medium.

Eighth; to provide a machine which is quickly and easily unloaded, loaded and reset, even in total darkness, and which after starting, is automatically actuated and controlled to expose the successive steps, and to stop the machine and terminate the illumination at the completion of a cycle of operations.

Ninth; to provide a machine of small size, easily handled and conveniently portable, of light weight, simple in construction, and economical to manufacture.

In describing the invention reference will be made to the accompanying drawings in which.

The machine includes a base 20 or other suitable support and having a plane top 21 forming a bed or support for the material to be tested and for supporting the superstructural parts which include the end bearings 22 and 23 in which are rotatably mounted a timing drum 24 and a feed screw 25 parallel thereto. A guide bar 26 and a shutter slide bar 27 are non-rotatably secured in these bearings.

A holddown frame 28 is mounted on the bed 21 and securable in some suitable manner, for example by means of hinges 29 and spring clasps or latches 30.

A standard 31, preferably non-circular in cross section has its lower end cylindrically formed to snugly fit in the bore 32 and has a pin 33 which fits in the groove 34 to insure centering of the lamp 35 directly over the holddown frame 28 for equal and uniform distribution of light on the photo-sensitive material 36 during exposure.

Figures 3, 4, 5:
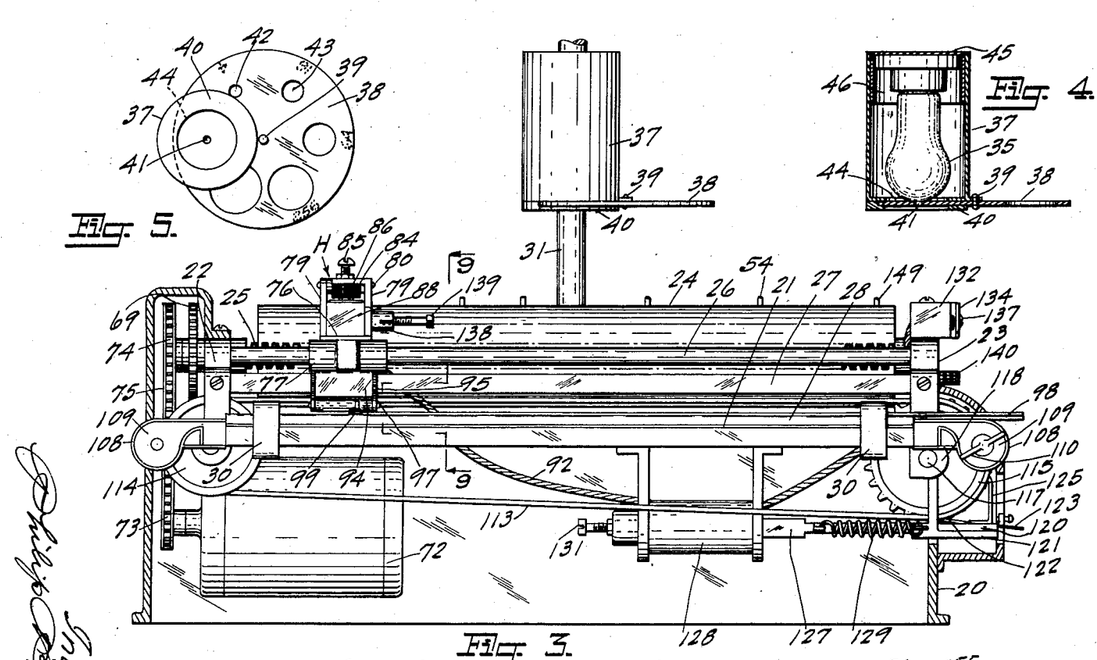
Fig. 3 is a front elevation with the front of the base cut away to show the actuating or driving mechanism.
Fig. 4 is a sectional elevation through the source of illumination.
Fig. 5 is a bottom view of Fig. 4 and shows the Waterhouse type diaphragm and the method of mounting the diaphragm.

The lamp 35 is enclosed in a lamp housing 37 which may be of any conventional form suitably ventilated but must form a perfect light trap. This housing is provided with a diaphragm preferably of the Waterhouse type illustrated and which consists of a disc 38 which is pivoted at 39 and guided and supported in contact with the bottom of the housing by means of the guard 40. This disc has a series of precision light passages 41, 42, 43, of gradually increasing diameters, the largest of which is equal to the diameter of the passage 44 formed through the bottom of the housing. A sliding diaphragm, not shown, can be substituted.

It is important that the lamp housing be so constructed that the lamp 35 can be adjusted to bring the envelope of the lamp practically in contact with the diaphragm 38 as illustrated, so that a perfect spread of light rays can be obtained on the sensitive material irrespective of the size of the stop such as 41, and for this purpose the lamp base support 45 is adjustable as by sliding or telescoping as indicated by the dependent wings 46. Furthermore, the lamp must center over the stop as shown. An iris diaphragm not shown but well known, can be substituted though there is little likelihood that it would prove completely successful since any slight variation in adjustment would create a very material difference in the amount of light passed.

This lamp housing is supported by a bracket 47 which has a friction sleeve 48 frictionally slidable on the standard 31, and which sleeve is frictionally adjustable through the medium of the screws 49. The standard 31 is graduated as indicated at 50 in values of relative light strengths on the sensitive material supported on the bed or support 21.

Thus the light is adjustable as to distance by sliding the bracket 47 on the standard, and also by limiting the quantity of light rays passing to the sensitive material by adjustment of the diaphragm 38. The stops 41, 42, 43 are identified and designated in terms of the relative quantity of light rays passing, so that if a $\frac{1}{32}$ hole is given a value of 1, a $\frac{1}{16}$ inch hole will have a value of 4.

Figures 7, 8:
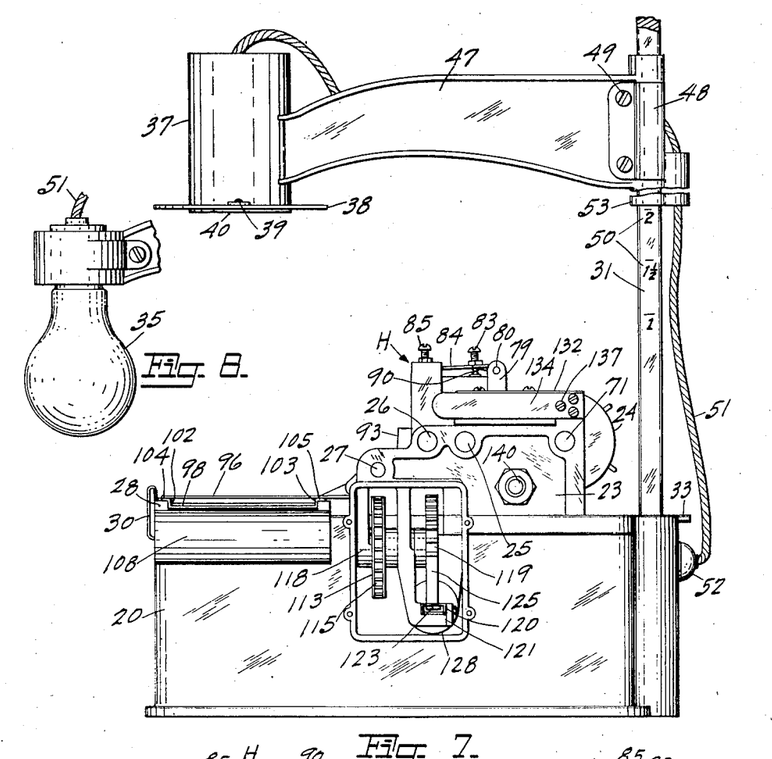
Fig. 7 is a side elevation of Figs. 1 and 3, with the ratchet and sprocket housing removed.
Fig. 8 illustrates the method of mounting an open lamp as a substitute for the enclosed lamp of Figs. 3 and 7.
Figure 9:
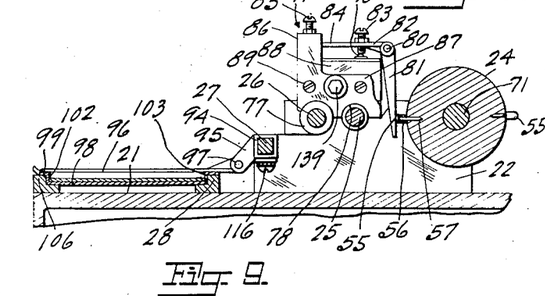
Fig. 9 is a section taken on line 9—9 of Fig. 3.
Figure 10:
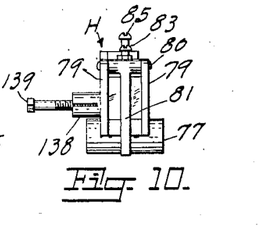
Fig. 10 is a rear elevation of the trigger mechanism and automatic control for the timing switch.

The lamp cord 51 plugs into the machine as indicated at 52, thus permitting removal of the lamp and substitution of other lamps, as for instance the open lamp illustrated in Fig. 8. It also permits removal of the standard 31 when the machine is not in use.

This standard may be made telescopic as indicated by the broken sleeve at 53 extending downward from the friction sleeve 48, but with which construction it would be necessary to transfer the friction creating element from the bracket to the bottom of the sleeve.

The shutter control consists of the timing drum 24 which is provided with a supply of trigger pins 54 equal to the number of step exposures which the machine is designed to produce, plus one, and these pins are preferably formed with a spherical head 55 with cylindrical body 56 of equal diameter and with a reduced diameter penetrating or pin portion 57, the pin thereby forming its own gauge.

These pins can be set into a metal cylinder in which close fitting holes are provided to frictionally secure the pins. However, a more economical and more satisfactory construction consists in forming the drum out of wood or other suitable similar material; white pine proving very satisfactory, since the pins are easily driven in place and easily removed, thus providing universal adjustment of the timing means.

This drum is calibrated longitudinally in seconds as indicated at 58, and circumferentially in decimal parts of a second as indicated at 59. A spiral is scribed as indicated at 60, and which may be in the form of a continuous line, though preferably as a tracer 61 with the dots or holes spaced to divide each main circumferential division into an equal number of parts. For example, with a two inch diameter drum, the circumferential divisions will be $\frac{1}{16}$ inch apart with twenty divisions, these divisions being indicated at 62, and the dots 61 if made $\frac{1}{16}$ inch apart would represent $\frac{1}{100}$ second exposure each with the drum turning one revolution per second.

Figures 1, 2:
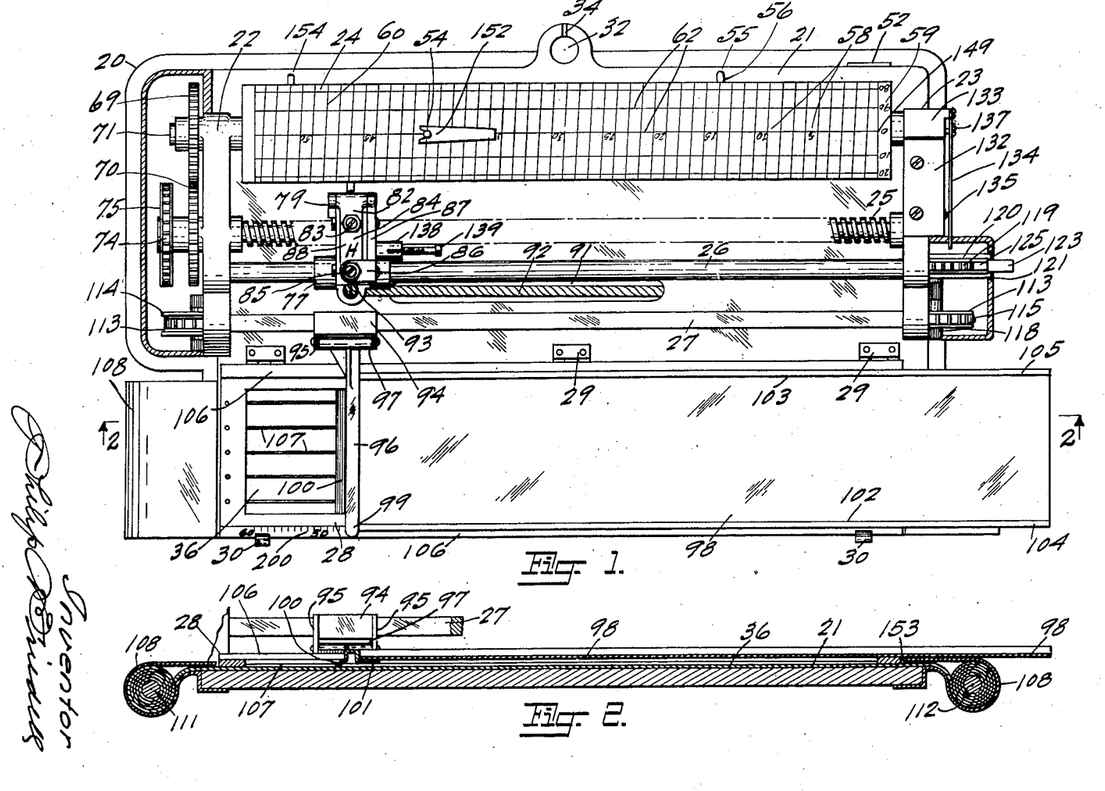
Fig. 1 is a plan view of the invention.
Fig. 2 is a section taken on line 2—2 of Fig. 1, and shows a roll of film threaded in place and in the process of being exposed.
Figures 16, 17:
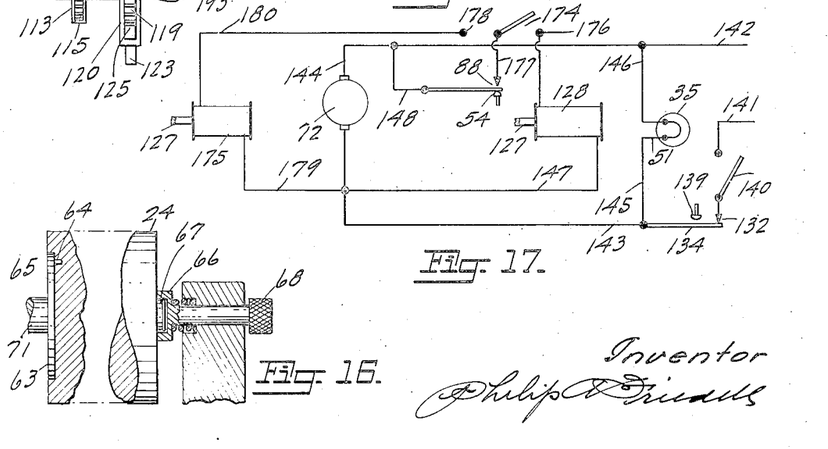
Fig. 16 is a fragmentary view showing the method of constructing and mounting replaceable timing drums.
Fig. 17 is a wiring diagram for the adaptation illustrated in Fig. 15.

This drum is ordinarily non-removably mounted as in Fig. 1, since the same drum can be used for an infinite variety of timing arrangements; however, where a great many tests are to be made, the drum is preferably removably and replaceably mounted as indicated in Fig. 16, in which a plate 63 having one registering pin 64, forms a pilot and seats in a seat 65 in the drum at the drive end, and a spring-urged pivot 66 cooperates with a mating pivot 67 at the other end, and by retraction of the knurled head 68 the drum is released and can be removed.

The reason for introducing this feature lies in the fact that for certain tests, such as threshold speed, exposure factor, characteristic curve production, and the initial step in producing a photographic wedge, and range determinations, the same pin setting is used; while further steps in producing a wedge, range elongation, and absolute precision tests down to the limits of perceptibility, will all require different pin settings.

For speed, sensitivity, contrast, range, characteristic curves, developer characteristics and related tests, the trigger pins are set in geometrically progressive relation irrespective of the material to be tested; therefore one drum can have this pin setting as a permanent adjustment. For the final steps in making photographic wedges and for other tests, the pin settings or adjustment of the timing mechanism will have to be changed for every different type and grade of photo-sensitive material and for every change in developer or development, and these pins are more easily removed and set in their new positions than would be the adjustment of pins in a T-slot or on a spiral on which they might be clamped. They can be more accurately set and will act with far greater precision than would be possible with a ribbon provided with apertures and which ribbon would have to be replaced every time that a new timing arrangement was required, although such a ribbon (not shown) could readily be used to actuate the trigger which cooperates with the pins, particularly due to the minute movement required.

As will be noted, the adjustment of this timing device is universal as to the number of included steps and as to the exposure for each step. Any step can be given the total cumulative exposure or any portion of it down to the merest fraction. It is therefore adaptable as a precision timing device for any type of apparatus and operates perfectly for precision photo-printing.

The feed screw 25, when operated at the same speed as the drum, has the same pitch as that of the spiral 60 on the drum, but opposite hand, since the screw and drum turn toward each other, being coupled together by the gears 69 and 70 which are respectively fixed on the drum shaft 71 and on the outer end of the feed screw 25.

This feed screw is rotatably mounted in the bearings formed in the bearing brackets 22 and 23 as indicated, and the screw and drum are driven in synchronism by perfectly-timed driving means such as a synchronous motor 72 driving through a positive drive, such as sprockets 73 and 74 and chain 75. This motor preferably has an included gear reduction unit for simplifying construction.

The shutter actuating mechanism and controlling mechanism includes a traveling head H carried by the feed screw 25; a shutter arm; and driving means for moving the shutter arm and its associated shutter in a series of steps which are controlled as to elapse-time periods by the timing drum.

The traveling head H consists of a frame having a base 76 having an integral hub 77 which is slidable and rotatable on the rod 26, and a half nut 78 is formed in the underside of the base and rests on and cooperates with the feed screw 25, whereby, when the feed screw is rotated, the head will be carried from one end of the screw to the other, and will permit the head to be tipped up and about the rod 26 to clear the half nut from the thread for manual return of the head to its initial or starting position.

A pair of arms 79 project upwardly from the base and have pivoted therebetween as indicated at 80, a trigger having a depending rigid arm 81 having an integral rigid lever 82 extending oppositely from the pivot as far as the adjusting screw 83 and continuing therefrom in the form of a leaf spring 84, the urgence of which is controlled by means of the adjustable screw 85 which is adjustably secured in the overhanging arm 86 which is supported by the base 76, and a flange 87 continues along the base and forms means for securing the "Microswitch" 88 in position through the medium of the screws 89; the screw 83 cooperating with the plunger 90 on the switch.

The screw 83 is adjusted to adjust the trigger 81 for correct cooperation with the trigger pins 54, after which the screw 85 is adjusted until the urgence of the spring causes the plunger 90 to be depressed to open the switch, this being a normally-closed switch. Thus, when a pin 54 engages the trigger, the screw 83 is raised, permitting the switch to close, and as soon as the pin leaves the trigger the spring 84 instantly opens the switch. The actual movement required at the point of the screw 83 to allow the switch to close or to open it is less than one-thousandth of an inch, so that an almost imperceptible movement of the trigger is required and the actual contact with a pin can be extremely brief, and the tension of the spring 84 need be only a few ounces, therefore instant response is attained, and each time a pin touches and leaves the trigger, a circuit is closed and opened through the switch 88.

A passage 91 is formed through the bed 36 of the machine for the circuit cable 92 which is very flexible, and this cable passes to the switch 88 through the eye 93 which is integral with the base 76.

The shutter arm consists of a sleeve 94 which is slidable on the square bar 27 and which sleeve has forwardly-projecting ears 95 between which one end of the shutter arm proper 96 is pivoted as indicated at 97, so that the shutter arm proper with its shutter 98 can be swung back out of the way for placing the photo-sensitive material 36 in position and for its removal, and this arm has a finger portion 99 for convenient lifting of the arm, and the arm rides on top of the holddown frame as shown.

This arm has an inclined lip 100 which almost touches the sensitive material 36, the inclination preventing reflections onto the material, and also provides a sharp defining margin to the steps, and this arm also has a projecting shelf 101 to which one end of the shutter or blind 98 is attached.

The shutter 98 is formed of very light weight opaque material and is preferably formed as indicated with the main shutter portion flat and having the sides 102 and 103 formed up at right angles and terminating in horizontal flanges 104 and 105 which rest on the guide bars of the frame to form a perfect light seal for the material under test, and yet to be free to permit the shutter to be swung up out of the way for loading and unloading of the material.

The holddown is constructed in the form of a rectangular frame 28 having a plane bottom surface and a shutter guide bar 106 along each side on top, and the walls 102 and 103 of this shutter fit between these guides and the flanges 104 and 105 rest on top of them.

This frame is provided with removable threshold indicators 107 which extend throughout the length of the frame and are located with their undersurfaces in contact with the material clamped by the frame. A very satisfactory material for making these indicators is strong black thread drawn taut.

This machine is adapted for testing strips, ribbons or sheets of sensitive material, and also for spooled material such as roll films, for which a roll housing 108 is provide at each end of the bed 21. Each roll housing is provided with a telescoping cover 109, and one of these covers is provided with a key 110 for winding the film 36 from one spool 111 to the other spool 112, thus the remainder of the film is fully protected while a portion thereof if being exposed.

The driving or transporting means for the shutter consists of a flexible band, such as a belt or chain 113 which operates over a pulley 114 at one end of the machine and over a sprocket 115 at the other end, and the band is intermediately attached to the sleeve 94 as indicated at 116. If this band is made of belting or ribbon, it is provided with holes for the sprocket teeth. The sprocket 115 is fixed on the shaft 117 which is supported by a dependent bearing 118, and forms positive cooperating means for the band.

The driving means for the shutter arm consists of a ratchet 119 which is also fixed on the shaft 117; and a driving and control apparatus consisting of a slide 120 which is slidably supported on a dependent slide bearing 121 and which has a pawl 122 formed directly from the upper wall which is formed of spring material, and this spring pawl has a release lever 123 fixed thereto and projecting out through the side wall of the base 20 of the machine, and the outer end of the slide bar 120 is turned up as indicated at 124 to form a combined gauge and stop for gauging the travel of the shutter for each step as indicated at 125. This gauge engages the next following tooth 126 as the shutter is advanced to stop movement of the shutter and exactly space the steps, thus entirely eliminating the necessity for stop pawls or brakes and the consequent friction introduced. This slide bar and its associated elements are made as light in weight as possible, as is also the shutter arm and its associated elements, thus reducing inertia to a minimum and reducing the power required for operation and assuring precision timing and instantaneous action and response. The total weight of all of these parts does not exceed a few ounces.

Attached to the inner end of the slide bar 120 is the core 127 of a solenoid 128, and suitable springs 129 retract the core and reset the pawl 122 and release the stop 125, and a screw 130 forms an adjustable stop for precise limited movement of the slide for retraction to just sufficient degree to permit the pawl to engage the next tooth.

The solenoid 128 has a stop screw 131 which is adjustable to limit the movement of the core, and its correct adjustment is such that the gauge 125 stops the ratchet by engagement with a tooth as indicated at 126 at the same instant that the core 127 engages the inner end of the screw 131, thus preventing any possibility of wedging or springing of the gauge 125.

The terminal step timer and machine control consist of a normally "off" "Microswitch" 132 which is mounted on top of the bearing bracket 23 upon which an anchor block 133 is formed and upon which block a leaf spring 134 is mounted and which normally depresses the plunger 135 to close the switch, and the correct tension is provided in this spring by the tension adjusting screw 137. A boss 138 is formed on the traveling head H and is threaded to frictionally secure an adjustable stop 139. This stop cooperates with the free end of the spring 134 and forces it away from the switch plunger 135 at the instant that the timing drum reaches its zero position, permitting the switch to break the various circuits including that to the lamp 35. A manually controlled switch 140 is wired in series with the switch 132 for manual starting of the machine.

Figure 11:
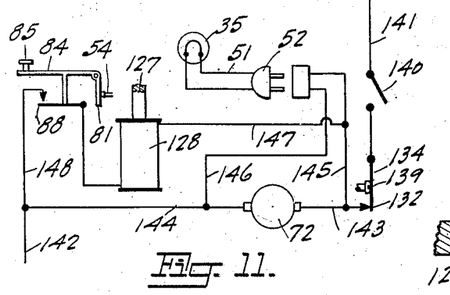
Fig. 11 is a wiring diagram for the machine.

Fig. 11 is a wiring diagram for this machine. The source of potential is indicated by wires 141 and 142, and the wire 141, switch 140 and switch 132 are connected in series, while the motor 72 is connected through wires 143 and 144 respectively to the switch 132 and line 142. The lamp 35 is connected in parallel with the motor through wires 145 and 146, and the solenoid 128 is also connected in parallel with the switch 88 in series, through wire 147, solenoid 128, switch 88 and wire 148 to line 142.

The adjustment of the machine is carried out as follows: The spiral indicator 60 is centered with the trigger 81. A trigger pin 54 is located at the zero position 149 on the timing drum. The head H is moved to the terminal end of the screw and the drum is turned until the pin 149 just touches the trigger. The screw or stop 139 is then adjusted to just contact the spring 134. The drum is then rocked forward slightly and the blick of the two "Microswitches" noted, and the screw is adjusted until the click of the two switches is simultaneous. Thus the machine will be stopped and the light turned off at the exact zero position. The pin at the zero position is now removed.

For tests of speed, sensitivity, exposure factor, range, for production of characteristic curves, and for initial steps in making a photographic wedge, the respective exposures are calculated according to the formula $$R = \sqrt[n-1]{\frac{L}{F}}$$

in which

R=Ratio of progression,
n=Number of steps,
L=Cumulative exposure in seconds, and
F=Exposure of last step in seconds.

for geometrically progressive series, and the pins are set in the drum counting from zero according to the respective values, but placing no pin at zero.

Figure 13:
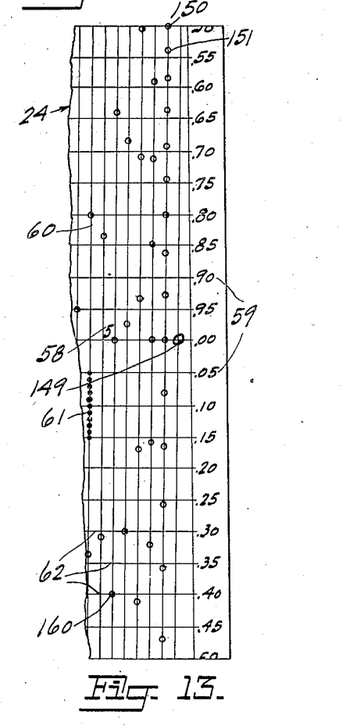
Fig. 13 is a full size partial development of the shutter control or timing drum.

Fig. 13 shows geometrically progressive pin settings for the low exposure end of the drum and based on R=1.079. The first pin setting 150 is on .50 second=F in the above formula, and the second pin setting 151 is on .54 second.

If ordinary round headed pins are used it will be necessary to use a gauge for height, a suitable type being indicated at 152 in Fig. 1, to insure micrometric precision, since any variation in projection of the pins will affect the accuracy of timing. The shouldered pins are preferable, or pins set in friction holes with suitable stops and with the pins of exactly equal length.

Taking the testing of roll film, the shutter and shutter arm are swung up out of the way, the latches 30 are released and the holddown frame is lifted. The roll film is placed in the left hand spool housing, threaded along the bed as indicated at 36 and started on an empty spool 112 and inserted in the other housing; the covers 109 are applied and the film is wound by means of the thumb blades 110 until the first end of the film reaches the inner end 153 of the film housing extension. The holddown is then dropped in position and latched, and the shutter dropped in position on the holddown. The shutter arm is located at the left hand end of the slide rod and the traveling head H is located just to the left of the first cooperative trigger pin as 154. Switch 140 is open and the height of the lamp 35 and the diaphragm have been adjusted.

Figure 12:
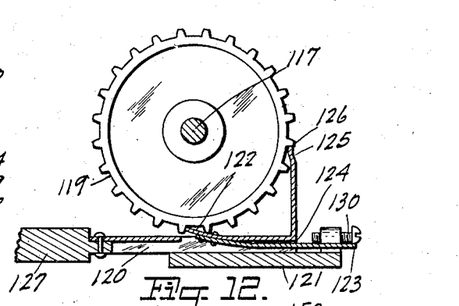
Fig. 12 is an enlarged detail view of the shutter feeding mechanism.

Switch 140 is now manually closed closing the motor circuit and the lamp circuit, starting rotation of the drum and travel of the head H. As the drum rotates, the first pin 154 wipes the trigger 81 and lifts the screw 83 permitting switch 88 to close the circuit to solenoid 128 which draws the core 127 against the action of springs 129 and draws the pawl 122 which engages a ratchet tooth, rotating the ratchet which through its shaft and sprocket 115 pulls the shutter arm to the right until the movement of the core is stopped by the screw 131. Coincidently the gauge 125 has moved under the next following tooth as indicated in Fig. 12 and stopped the ratchet and the shutter. As the trigger pin leaves the trigger, the spring 84 depresses the plunger 90 on switch 88 breaking the circuit to the solenoid and the springs 129 instantly retract the core 127 and cause the pawl 122 to take up another tooth ready for the next shutter operation, the retractive movement of the core being stopped by the stop screw 130.

This movement is repeated each time a trigger pin wipes the trigger until the last one 150 has been passed, (Fig. 13), the head H continues to travel until the stop 139 contacts the spring 134, permitting switch 132 to open and breaking the circuits and stopping the machine and extinguishing the lamp.

The switch 140 is now manually opened, the shutter arm with its shutter, and the holddown are raised, and the exposed material advanced or removed, after which the head H is tipped to clear its feed screw and the pins and moved back to its starting position; the release 123 is lifted to cause the pawl to clear the ratchet teeth, and the shutter is moved back to its starting position. The machine is now ready for another operation.

The exposed material is developed in a master developer and the negative produced or the print produced in the case of positive material will have an unexposed strip for each indicator 107, and at the low exposure end, the step in which this strip is finally visible is the threshold step and the exposure given this step is the threshold exposure factor of the material when multiplied by the power of the lamp on the material during exposure.

In fitting up this machine, the illuminating power of one lamp only and for only one distance, is determined by known means, establishing a master source of illumination, and further determinations are made photographically by the process outlined in the previously mentioned copending application, or by the use of this machine.

For further tests in this machine, after determining the rating of the one lamp at the one distance, a sheet of sensitized paper which has been selected as a master is exposed with the setup just described for speed and similar tests and developed in the master developer, thus producing a master print which is preserved, and a permanent record is made of the exposure given the initial black step, which multiplied by the power of the lamp on the surface of the material, and by the ratio of the squares of the distance of the lamp in inches and of 12, establishes the exposure factor of the material in foot-candle-seconds.

To determine the relative power of any other lamp thereafter and for determining the ratios between the stops of the diaphragm, the process is repeated, substituting the lamp or stop for making the exposures, and the exposure given the initial black step divided by the exposure of the initial black step in the previously mentioned master print establishes the relative speed. Thus the relative true photo-actinic value of any source of illumination can be accurately determined. Photo-electric meters and similar devices cannot be used for other than the initial or master determination since such devices are sensitive to all light, both photo-actinic and non-actinic, and therefore provide no true measure of photo-actinic values. In other words they are color-blind.

Figure 6:
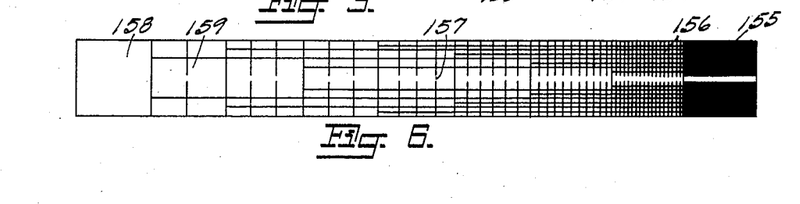
Fig. 6 is a diagrammatic view illustrating the effect of the threshold speed and range indicator.

Fig. 6 may be considered either as a print made from the speed test negative or as a direct test of the speed of a paper. If it is a print from the negative, the unexposed indicator line will appear as a black line extending throughout the series of steps until it reaches the initial black step where it will be blocked out as in 155, and will be barely visible in the next higher step 156. Thus this step 156 is the threshold step, and the exposure given this step establishes the relative speed of the negative material. These tests can be carried out on materials which develop in color and the tests are therefore not limited to black and white.

If Fig. 6 is considered as a positive material test, such as bromide, bromo-chloride or chloride paper exposed directly in the machine, then the indicators 107 will appear as a white line 157 and this line will fade out completely in the initial white step 158 and be just barely visible in the next higher exposed step 159, thus establishing by the exposure given step 159 the threshold speed of the paper, while the exposure factor of the paper is determined by the exposure given the initial black section 155.

Developers are tested by the same process but substituting the developer under test for the master developer. The variations or shifts in tones, tonal range, threshold speed and exposure factor as compared with the master print establish the relative values of speed and contrast characteristics of the developer under test.

For making photographic wedges either positive or negative the initial process is carried out as previously outlined for speed tests and the threshold step determined. A second strip of the material is then exposed with the lamp adjusted to bring the entire range of the material within the limits of the series of steps.

Taking negative material as an example. Suppose that the indicator line fades out in step 31

(see Fig. 13), at 160, the exposure of which is 5.4 seconds. The lamp or the diaphragm must then be adjusted to give 5.4+.5 (the final step exposure) =10.8 times the illumination on the surface of the material, which will bring the fade-out of the indicator down to step 1. The method is more explicitly presented in Fig. 14 from this point.

Figure 14:
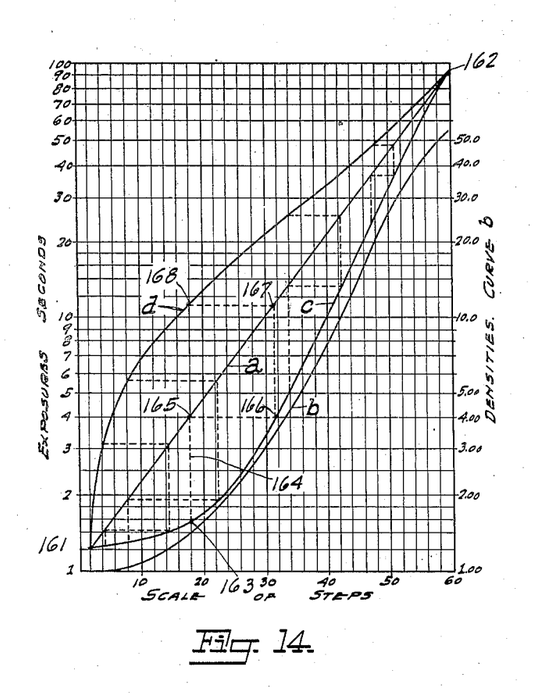
Fig. 14 is a graph illustrating the method of determining the setting of the pins on the timing drum for producing a straight log-curve wedge or true geometrically-progressive series of densities or tones.

In Fig. 14, the line $a$ is the actual exposure curve of one material tested, and starting with an exposure of 1.2 seconds exposure for step 2, and terminating with 95 seconds for step 60 at 162. $b$ is the actual curve of densities determined and measured photographically. $c$ is the coordinated exposure density curve in which the overall density is elongated to the same value as the total exposure, and $d$ is the new exposure curve which is plotted as follows: Take step 18 at 163. A vertical 164 is carried to intersect the exposure curve $a$ at 165 and then carried horizontally from this point to meet the coordinated curve $c$ at 166, then carried vertically to the exposure curve $a$ at 167 and then horizontally to an intersection with step line 18 at 168. Thus, while step 18 was originally given an exposure of 3.98 seconds, the exposure for this step must be increased to 10.55 seconds to bring it directly on the exposure curve $a$, which will be converted into the density curve. After all transfers are made as indicated by the dotted lines, the new exposure curve $d$ is established and the drum on the machine is reset or adjusted to these new exposures, and a negative or positive made from the same material with this new series of exposure will produce a series of densities or tones which will fall directly on the straight log curve $a$ and therefore will form a perfect wedge.

Figure 15:
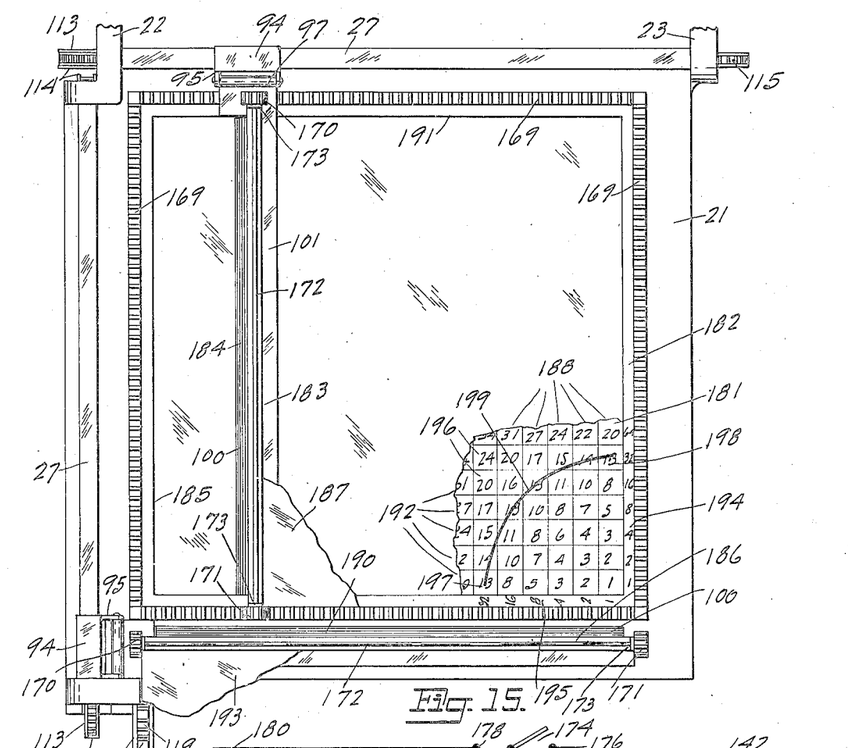
Fig. 15 is a fragmentary view showing adaptation of the machine to direct characteristic curve production.

In Fig. 15 is shown a modification of the invention which directly develops the characteristic curve path of the material. This involves no other changes than the addition of another shutter with its supporting and driving means and a modified holddown, with the two shutters operating at right angles to each other and selectively, and includes all of the previously described elements and mechanisms including the bed 21, which however must have sufficient area to form a square support for the material to be tested.

The modified frame is square as illustrated, and if of any appreciable size, aligning means will be required for the shutter and which is illustrated as consisting of racks 169 for cooperation with the pinions 170 and 171 which are fixed on the respective ends of the shafts 172 which are rotatably mounted in the shutter arms as indicated at 173, all of these shutter mechanisms being made as light in weight as possible. The pinions and shafts can be made of fiber, "Bakelite," or magnesium-aluminum alloy.

The wiring diagram is illustrated in Fig. 17. The right hand of this diagram is a duplicate of Fig. 11 with the modification of the two-way switch 174. The extension involved in this diagram consists of a second solenoid 175 which is selectively connectable in circuit.

When this switch is closed to contact 176, the circuit is completed by trigger pins 54 actuating switch 88, to close through wire 147, solenoid 128, contact 176, switch arm 174, wire 177, switch 88, wire 148 to line 142; while when the switch is closed to contact 178, the circuit is broken for the solenoid 128, and completed through wire 179, solenoid 175, wire 180, contact 178, switch arm 174, wire 177, switch 88, wire 148 to line 142.

The operation is as follows: A sheet of material 181 to be tested is clamped by the frame 182. Shutter arm 183 has its step-defining edge or lip 184 moved to the inner edge 185 of the frame, and shutter arm 186 is moved completely off of the frame as shown.

Switch 174 is moved to contact 176, after which switch 140 is closed, starting the timing mechanism and the lamp, and the shutter 187 exposes the sheet in a series of steps 188, and as the head H with its stop reaches the switch 132 it breaks the circuits to the motor and lamp, completing exposure of the final step and stopping the machine.

Switch 140 is now manually opened; the head H is moved back to its starting position; the arm 183 is moved to the outside of the frame 182 at the right, and shutter arm 186 is moved to the head end of the frame with its step-defining edge or lip 190 in contact with the inside edge 191 of the holddown frame.

Switch 174 is closed to contact 178 after which switch 140 is closed. The exposures are thus duplicated at right angles to the first series as indicated by the steps 192, and after the shutter 193 has completed its exposures the machine is again automatically stopped, switch 140 is manually opened, and the material 181 is removed and developed.

The result is fragmentarily illustrated in one corner of the holddown frame by means of relative density values. It will be noted that duplicate exposures occur at diagonally opposite corners, the exposures being equal to the sums of the step exposures indicated at 194 and 195, the values being taken at 196 as relative densities for purposes of explanation instead of the sum of the two exposures.

The densities will not follow the relative exposures due to their being affected by the characteristic curve of the material. The duplicate exposures at the two diagonally opposite corners are taken as a base, and the square in each step which has the same density as the diagonally related base squares, as 197 and 198, are determined, and a curve 199 is drawn through the centers of these squares, forming the characteristic curve of the material. The densities are determined as previously outlined or by means of a densitometer, since the actual photo-actinic values are not important where the characteristic curve is to be plotted.

The holddown frame, Fig. 1, is provided with graduations 200 so that the machine may be used for whatever number of steps is desired, or to conform to the length of the material to be tested. When the full scale is not used, the head H is set for cooperation first with the trigger pin which is identified with the starting step.

The steps need not be greater than one-eighth inch each, therefore one hundred steps can easily be formed on a twelve inch strip of sensitive material.

In testing materials, all contact papers can be tested for speed with the same setting and lamp adjustment, and likewise all bromide and bromochloride papers can be tested with the same settings, requiring only a different lamp adjustment than the chloride papers, and the same applies to all ultra-sensitive materials, such as films and plates.

For this reason, narrow strips can be cut from a number of different materials of the same class, backbound with "scotch" tape to form a mat and exposed simultaneously and developed. With an inside width of three inches in the holddown, and material cut in one-quarter inch ribbons, twelve different grades or makes of materials can be tested simultaneously. An indicator 107 is provided for each ribbon of material.

Obviously, a film or ribbon could be used for making and breaking the circuits, as could also a photo-electric circuit, neither of which is shown; however, the method illustrated is instantly responsive due to the extremely minute movement required by the trigger.

Furthermore, an escapement such as is used on a typewriter, also not shown but well known, could be readily operated by the trigger 81 by having the escapement bar with which the type bars cooperate in a typewriter, cooperate with this trigger, but a greater movement of the trigger would be required, reducing the responsiveness and sensitivity of the machine, therefore the structure illustrated is obviously the most efficient and rapidly responsive and operates with utmost precision and is therefore the preferred form of the invention.

It will be understood that variations in construction and arrangement of parts, and variations in the process, which variations are consistent with the appended claims, may be resorted to without detracting from the spirit or scope of the invention, or sacrificing any of the advantages thereof.

I claim:

1. A photo-sensitive material exposing and measuring machine, in combination, means for supporting a photo-sensitive material; a shutter and step driving means for driving said shutter in a series of steps throughout the length of the material; a lamp for exposing said material as said shutter permits access of light from the lamp thereto; timing means controlling said shutter and initiating movement thereof for each step, and means included in said timing means and comprising a timing element for each step, said timing elements being individually and manually adjustable for selective adjustment to establish any desired elapse time periods between any two successive shutter movements without affecting the timing of other shutter movements; driving means for said timing means, and means manually operable for starting operation of said machine and coincidently lighting said lamp, and operation terminating means included in said timing means extinguishing said lamp and terminating operation of said driving means after said shutter has been moved to the end of its series of steps and coincident with termination of the elapse-time period for the last step.

2. In combination, a support and holding means for photo-sensitive material; a shutter for protecting said material and movable to expose said material in a series of steps; shutter driving means associated with said shutter for moving said shutter instantaneously through the length of each step; control means for said shutter-driving means for initiating actuation thereof, said control means including a timing element for each step for establishing the elapse-time periods between successive actuations of said shutter-driving means and the resultant movements of said shutter, said timing elements being selectively manually adjustable for independently and selectively establishing the elapse-time periods between any two successive steps without affecting the elapse-time periods of other steps; synchronous driving means for said control means and the included timing means; a source of illumination; means manually operable for starting said synchronous driving means and coincidently creating illumination of said source of illumination; and means included in said timing means terminating operation of all of said means.

3. A photo-sensitive material measuring machine, in combination; means for supporting a photo-sensitive material; a shutter and step driving means for driving said shutter in a series of steps throughout the extent of the material; a lamp for exposing said material as said shutter permits access of light from the lamp thereto; timing means controlling said shutter and initiating movement thereof for each step; and means included in said timing means and manually adjustable to establish any desired elapse time periods between successive shutter movements; driving means for said timing means, and means manually operable for starting operation of said machine and coincidently lighting said lamp, and operation terminating means included in said timing means extinguishing said lamp and terminating operation of said driving means after said shutter has been moved to the end of its series of steps and coincident with termination of the elapse-time period for the last step; a second shutter operable at right angles to said shutter and a second step driving means for said second shutter; and means associated with said timing means for transferring control from said shutter to said second shutter to carry said second shutter through a series of duplicate steps at right angles to the first series produced by said shutter first mentioned.

4. A photographic exposing and measuring machine comprising a support; sensitive material holding means associable with said support; a drum and a feed screw operating in parallel and synchronous driving means therefor; trigger pins located on said drum; a traveling head carried by said screw; a normally-closed switch carried by said head and a trigger carried by said head in cooperative relation to said trigger pins and including a first switch-control member urging said normally-closed switch to open; cooperation of any one of said pins with said trigger overcoming the urgence of said first switch-control member to permit said switch to close; a source of illumination; a second switch-control member mounted on said head and a second switch mounted in cooperative relation to said second switch-control member and separate from said head; said second switch-control member acting to open said second switch when said head reaches its terminal of travel to extinguish said source of illumination and stop said synchronous driving means; a shutter unit operating cooperatively with said holding means and including an arm and a support for rectilinear travel thereof; a continuous flexible band attached at one point to said arm and operating over rotatable members one of which cooperates positively therewith and a ratchet fixedly associated with said one; a slide element including a pawl and a gauge for cooperation with said ratchet; a solenoid having a core connected to said slide element and retracting springs associated therewith; said first switch controlling operation of said solenoid to move said shutter in steps in accordance with the relative positions of said pins in said drum, and the spiral spacing of said pins establishing the elapse-time periods between movements of said shutter.

5. A photographic exposing and measuring machine comprising a holder for photo-sensitive material; a source of illumination; shutter means cooperatively related to said holder for exposing said material in a series of steps; timing means including a manually adjustable timing element for each step for controlling time-elapse periods between successive step movements of said shutter; said timing elements being individually and selectively adjustable for changing the time relation between any two steps at will without affecting the time relation between other steps; instantaneously-acting driving means controlled by said timing means and including movement limiting and gauging means for said shutter; means manually controlled for initiating operation of said machine and coincidently illuminating said source of illumination; and means included in and controlled by said timing means and associated with said machine terminating operation of said machine and of said source of illumination at the completion of the elapse-time period following the terminal movement of said shutter.

6. A photographic exposing and measuring machine comprising a holder for photo-sensitive material; a source of illumination; shutter means cooperatively related to said holder for exposing said material in a series of steps; timing means controlling time-elapse periods between successive step movements of said shutter; instantaneously-acting driving means controlled by said timing means and including movement limiting and gauging means for said shutter; means manually controlled for initiating operation of said machine and coincidently illumination; and means included in and controlled by said timing means and associated with said machine terminating operation of said machine and of said source of illumination at the completion of the elapse-time period following the terminal movement of said shutter; second shutter means cooperatively related to said holder and operable to expose said material in a series of steps at right angles to said first mentioned series and including second instantaneously-acting driving means controlled by said timing means and including gauging means for said shutter, and manually controlled means for transferring control from one instantaneously-acting driving means to the other, whereby said material, through two operations of said machine sequentially through the respective shutter means is exposed in two right-angularly-related series of steps of equal exposure values to establish a characteristic curve path for the material.

7. A structure as defined in claim 5; a threshold-speed registering and indicating device associated with said sensitive material holder and comprising a narrow opaque element extending throughout the length of said holder for forming a continuous unexposed line throughout the entire series of steps upon exposure of said photo-sensitive material for establishing the threshold step in the material by the step in which the line is no further traceable due to lack of contrast between the unexposed line and the remainder of the area of the step, following development of the material.

8. In combination, exposing means for a photo-sensitive material, and instantaneous driving means for moving said exposing means sequentially in a series of steps including a last step; means gauging the movement of said exposing means for equal movements for the respective steps; timing means controlling said driving means and including a timing element for each step with each element selectively manually adjustable for individually establishing the elapse-time period between any two steps without affecting the time-elapse periods between other steps; synchronous driving means for said timing means; a source of illumination; means manually operable for initiating operation of said synchronous driving means and of said source of illumination; and means associated with said timing means terminating operation of said synchronous driving means and of said source of illumination at the instant of the termination of the exposure period for said last step and forming the timing means therefor.

9. A photo-sensitive material exposing machine comprising; a holder for photo-sensitive material and a source of illumination for exposing said material; a shutter and step driving means therefor for exposing an increased area of said material with each movement of said shutter; control means for said driving means for timing the shutter movements and comprising a drum, a timing element for each movement of the shutter, said timing elements being each independently adjustably secured in said drum for manual adjustment of the elapse-time period between any two successive shutter movements without affecting the time-elapse periods between other movements; means for driving said drum at a constant speed; a traveling control member mounted in cooperative relation for sequential cooperation with said timing elements and actuated sequentially by said timing elements for initiating actuation of said driving means for the successive movements of the shutter; transporting means for transporting said traveling control member parallel to said drum; and an operative connection between said drum and said transporting means for driving said transporting means at a predetermined speed relative to the rotational speed of said drum.

10. In a sensitometer having a shutter and step driving means therefor for exposing a strip of photo-sensitive material in a series of steps by successive movements of the shutter; controlling means for controlling the time-elapse periods between successive movements of the shutter comprising; an individual timing element for initiating each actuation of said step driving means; a support for all of said timing elements, with each timing element individually manually adjustable on said support for changing the relative timing of any one timing element at will without affecting the timing of the other timing elements; actuating means cooperatively related to and sequentially actuated by said timing elements and operatively associated with said step driving means for actuation thereof coincident with cooperation of a timing element with said actuating means.

11. In a sensitometer having a shutter and step driving means therefor for exposing a strip of photo-sensitive material in a series of steps by successive movements of the shutter; controlling means for controlling the time-elapse periods between successive shutter movements comprising a drum having a thread formed spirally throughout its length and functioning as a timing element locating guide; a timing element for each shutter movement and supported by said drum and projecting from the periphery thereof and located along said thread and individually manually adjustable therealong for adjusting the time-elapse periods between any two successive shutter movements at will; transporting means operating parallel to the axis of said drum; and actuating means supported and transportable by said transporting means throughout the length of said drum and in cooperative relation to said timing elements for sequential actuation thereby, and operatively associated with said step driving means for initiating actuation thereof coincident with actuation of said actuating means by a timing element; and means for driving said drum at a predetermined speed and coincidently driving said transporting means for constant registry of said actuating means with the thread on said drum.

12. In a sensitometer having a shutter and electrically actuated step driving means therefor for exposing a strip of photo-sensitive material in a series of steps by successive movements of the shutter, and a source of exposure illumination and a circuit therefor; controlling means for controlling the elapse-time periods between successive movements of the shutter comprising; a rotatably mounted drum having a pin-locating thread formed spirally thereon, and timing elements comprising pins removably secured in said drum and removable and replaceable to any position along said thread for changing the time-elapse periods between any two successive movements of said shutter and including a pin for each shutter movement; a feed screw rotatably mounted parallel to the axis of said drum and extending throughout the length thereof; a switch and a support therefor supported by said screw and transportable thereby along said drum in cooperative relation to said pins for sequential actuation thereby, and an operative connection between said switch and said driving means for initiating actuation of said step driving means coincident with cooperation of said switch with each pin, and driving means for driving said drum and said screw for synchronism between the travel of the switch and that of the thread.

13. A structure as defined in claim 12; an adjustable member carried by said support and projecting in the direction of travel; a switch fixedly mounted in cooperative relation to said adjustable member and controlling the circuit for said source of exposure illumination and normally maintaining said circuit closed; said adjustable member effecting opening of the last mentioned switch at the instant when said support reaches its terminal of travel following the final shutter movement and forming the timing element for controlling the exposure of the last step.

PHILIP A. FRIEDELL.